US008274375B2

(12) United States Patent
Yamada

(10) Patent No.: US 8,274,375 B2
(45) Date of Patent: Sep. 25, 2012

(54) COMBINED RFID READER AND TRANSPONDER WITH COMMON ELEMENTS

(75) Inventor: Naoyuki Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 586 days.

(21) Appl. No.: 12/353,286

(22) Filed: Jan. 14, 2009

(65) Prior Publication Data

US 2009/0184805 A1    Jul. 23, 2009

(30) Foreign Application Priority Data

Jan. 22, 2008   (JP) ................................ 2008-012014
Aug. 11, 2008   (JP) ................................ 2008-207395

(51) Int. Cl.
*H04Q 9/02* (2006.01)

(52) U.S. Cl. .................. 340/10.51; 235/376; 340/572.1; 340/635; 399/10; 399/12

(58) Field of Classification Search .......... 235/375–378, 235/382–383, 385; 399/9–13, 75, 79–83; 340/5.2–5.27, 10.1, 10.4–10.6, 12.5–12.55, 340/571–572.7, 636.12; 455/41.1–41.3, 455/77–78, 83; 715/733–748
See application file for complete search history.

(56) References Cited

U.S. PATENT DOCUMENTS

| | | | |
|---|---|---|---|
| 7,225,280 B2 * | 5/2007 | Moran ............................ | 710/74 |
| 7,570,220 B2 * | 8/2009 | Hall et al. ...................... | 343/745 |
| 7,623,892 B2 * | 11/2009 | Hawkins ...................... | 455/556.1 |
| 7,775,442 B2 * | 8/2010 | Saarisalo ....................... | 235/487 |
| 7,882,541 B2 * | 2/2011 | Yasaki et al. ..................... | 726/2 |
| 7,979,026 B2 * | 7/2011 | Hulvey ........................ | 455/41.2 |
| 2004/0176032 A1 * | 9/2004 | Kotola et al. .................. | 455/41.2 |
| 2004/0257203 A1 * | 12/2004 | Maltsev et al. ............... | 340/10.1 |
| 2005/0132091 A1 * | 6/2005 | Shibata ............................ | 710/4 |
| 2005/0162674 A1 | 7/2005 | Yamada | |
| 2006/0095848 A1 * | 5/2006 | Naik ............................ | 715/716 |
| 2006/0258289 A1 * | 11/2006 | Dua .............................. | 455/41.3 |
| 2007/0026825 A1 * | 2/2007 | Wilson .......................... | 455/130 |
| 2007/0115125 A1 * | 5/2007 | Lyon et al. ................. | 340/572.1 |
| 2007/0216519 A1 * | 9/2007 | Yokoo et al. .................. | 340/10.1 |
| 2007/0222605 A1 * | 9/2007 | Andresky ................... | 340/572.7 |
| 2007/0248311 A1 * | 10/2007 | Wice et al. ....................... | 386/52 |
| 2007/0274242 A1 * | 11/2007 | Lamacraft et al. ............. | 370/310 |
| 2008/0018433 A1 * | 1/2008 | Pitt-Pladdy .................. | 340/10.4 |
| 2008/0081558 A1 * | 4/2008 | Dunko et al. .................. | 455/41.1 |
| 2008/0256129 A1 * | 10/2008 | Salinas et al. .............. | 707/104.1 |
| 2008/0272889 A1 * | 11/2008 | Symons ........................ | 340/10.1 |
| 2009/0088077 A1 * | 4/2009 | Brown et al. .................. | 455/41.2 |

(Continued)

FOREIGN PATENT DOCUMENTS

JP      2006-085637      3/2006

*Primary Examiner* — Benjamin C Lee
*Assistant Examiner* — Stephen Burgdorf
(74) *Attorney, Agent, or Firm* — IPUSA, PLLC

(57) ABSTRACT

A communication apparatus includes a first communicating part that reads data stored in a storage device of an outside apparatus and writes data in the storage device of the outside apparatus, a second communicating part that transmits and receives data with respect to the outside apparatus, and an operation controlling part that operates either the first communicating part or the second communicating part. The operation controlling part is configured to operate the first communicating part when power is supplied to the communication apparatus and operate the second communicating part when power is not supplied to the communication apparatus.

10 Claims, 14 Drawing Sheets

U.S. PATENT DOCUMENTS

| | | |
|---|---|---|
| 2009/0111378 A1* | 4/2009 | Sheynman et al. .......... 455/41.1 |
| 2009/0209203 A1* | 8/2009 | Chipchase .................. 455/41.3 |
| 2009/0291634 A1* | 11/2009 | Saarisalo .................... 455/41.1 |
| 2010/0009627 A1* | 1/2010 | Huomo ....................... 455/41.1 |
| 2010/0167644 A1* | 7/2010 | Winter et al. ................ 455/41.1 |

* cited by examiner

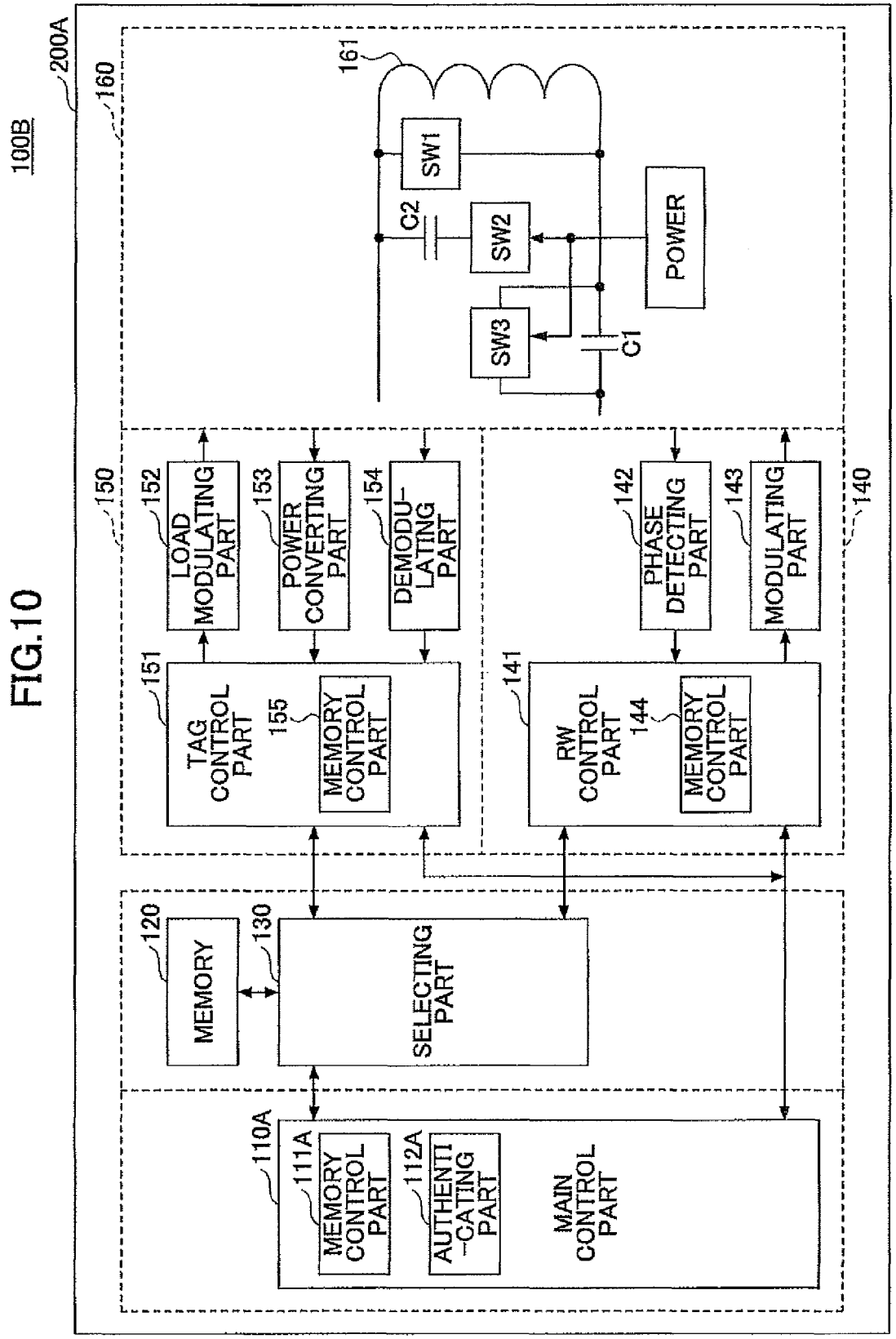

COMBINED RFID READER AND TRANSPONDER WITH COMMON ELEMENTS

BACKGROUND OF THE INVENTION

1. Field of the Invention

The present invention relates to an apparatus, a method, and a computer-readable recording medium for a communication apparatus.

2. Description of the Related Art

In recent years and continuing, an RFID (Radio Frequency Identification) tag is installed in a main body of an apparatus and is used for allowing the apparatus to communicate with an RFID system. The RFID system is an automatic recognition system capable of transmitting and receiving information without physical contact. The RFID system, which includes an RFID tag and an RFID reader/writer, is configured to perform wireless communications. The RFID tag includes an antenna and a memory in which information is stored. The RFID tag is controlled by the RFID reader/writer. Because the RFID tag is supplied with electric power by receiving wireless communications from the RFID reader/writer, the RFID tag requires no power source.

One example of an apparatus having an RFID tag(s) installed therein is an image forming apparatus. With the image forming apparatus, information unique to the image forming apparatus is stored in the memory of the RFID tag. In a case where a failure occurs in the substrate on which the RFID tag is mounted, information written in the RFID tag can be read out by using the RFID reader/writer so that the read out information can be written to an RFID mounted on a new substrate. Accordingly, even where a failure occurs in the substrate having an RFID tag mounted thereon, information unique to the image forming apparatus can be transferred to a new substrate.

In a related art example, Japanese Laid-Open Patent Publication No. 2006-85637 discloses an image forming apparatus with an RFID tag installed for enabling updating of a control program by wireless communications.

However, the related art example may be inconvenient because a separate RFID reader/writer is required in a case of transferring information written on one RFID tag to another RFID tag.

SUMMARY OF THE INVENTION

The present invention may provide an apparatus, a method, and a computer-readable recording medium for a communication apparatus that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention may be realized and attained by a communication apparatus, a communication method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a communication apparatus including: a first communicating part that reads data stored in a storage device of an outside apparatus and writes data in the storage device of the outside apparatus; a second communicating part that transmits and receives data with respect to the outside apparatus; and an operation controlling part that operates either the first communicating part or the second communicating part; wherein the operation controlling part is configured to operate the first communicating part when power is supplied to the communication apparatus and operate the second communicating part when power is not supplied to the communication apparatus.

Furthermore, another embodiment of the present invention provides a method of communicating by using a communication apparatus, including the steps of: a) reading data stored in a storage device of an outside apparatus and writing data in the storage device of the outside apparatus; b) transmitting and receiving data with respect to the outside apparatus; and c) executing step a) when power is supplied to the communication apparatus and executing step b) when power is not supplied to the communication apparatus.

Furthermore, yet another embodiment of the present invention provides a computer-readable recording medium on which a program is recorded for causing a computer to execute a communications method using a communication apparatus, the method including the steps of: a) reading data stored in a storage device of an outside apparatus and writing data in the storage device of the outside apparatus; b) transmitting and receiving data with respect to the outside apparatus; and c) executing step a) when power is supplied to the communication apparatus and executing step b) when power is not supplied to the communication apparatus.

Other objects, features and advantages of the present invention will become more apparent from the following detailed description when read in conjunction with the accompanying drawings.

BRIEF DESCRIPTION OF THE DRAWINGS

FIG. 10 is a block diagram illustrating a functional configuration of an image forming apparatus according to another embodiment of the present invention;

DETAILED DESCRIPTION OF THE PREFERRED EMBODIMENTS

Figure 1:
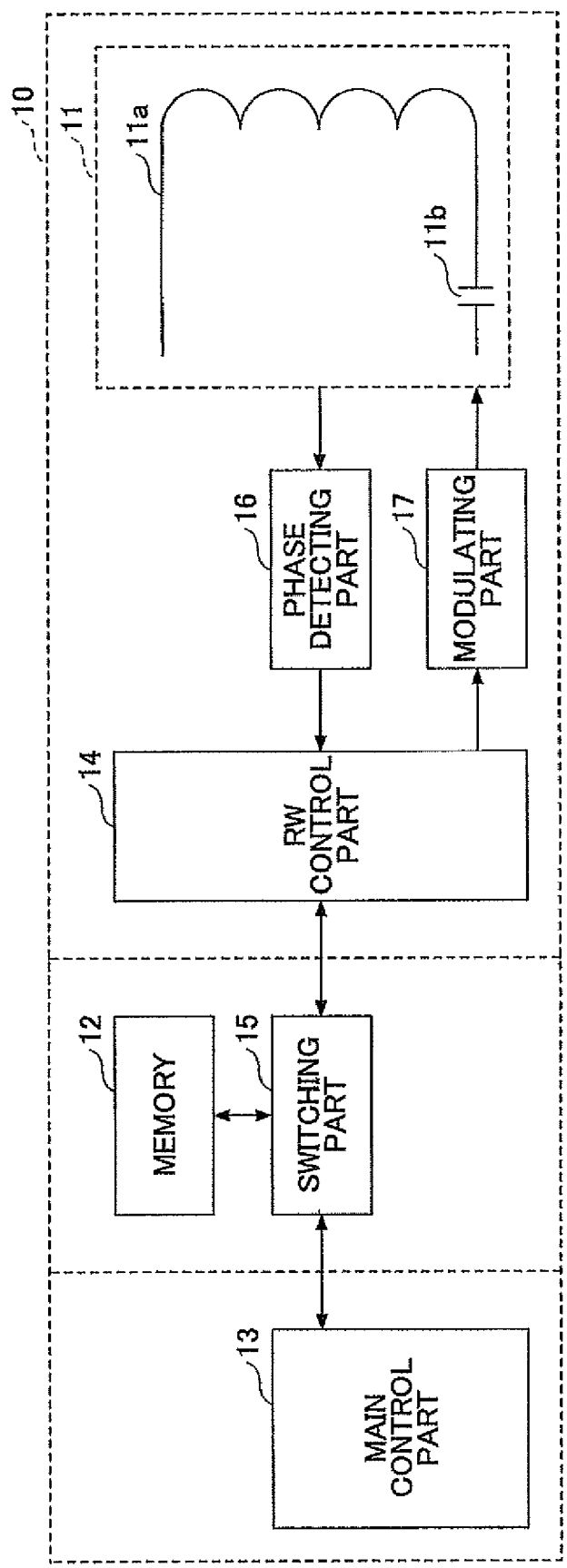
FIG. 1 is a schematic diagram for describing a configuration of an RFID reader/writer according to a related art example.

Before describing embodiments of the present invention, an RFID reader/writer and an RFID tag according to a related art example are described. FIG. 1 is a schematic diagram illustrating a configuration of an RFID reader/writer 10 according to the related art example.

The RFID reader/writer 10 includes an antenna part 11, a memory 12, a main control part 13, a reader/writer (RW) control part 14, a switching part 15, a phase detecting part 16, and a modulating part 17. The antenna part 11 has an antenna coil 11a and a resonance condenser 11b for communicating with an RFID tag(s). The antenna part 11 performs communications by using a resonance frequency defined by the antenna coil 11a and the resonance condenser 11b. The memory 12 stores information read from an RFID tag or information to be written to an RFID tag. The main control part 13 controls the overall operations of the RFID reader/writer 10. The RW control part 14 controls reception and transmission of the antenna part 11 and controls the reading/writing functions of the RFID reader/writer 10.

The switching part 15 switches access to the memory 12 for allowing either the main control part 13 or the reader/writer control part 14 to access the memory 12. The phase detecting part 16 detects a response signal from an RFID tag based on a phase shift between a response wave from the RFID tag received by the antenna part 11 and a carrier wave transmitted from the antenna part 11. The modulating part 17 generates a target modulation wave by loading information to be transmitted to an RFID tag onto a carrier wave transmitted by the antenna part 11.

For example, in a case of storing information to be transmitted to an RFID tag in the memory 12 of the RFID reader/writer 10, the switching part 15 allows the main control part 13 to access the memory 12. In another example, in a case of transmitting information stored in the memory 12 to an RFID tag or storing information read from an RFID tag in the memory 12, the switching part 15 allows the reader/writer control part 14 to access the memory 12.

Figure 2:
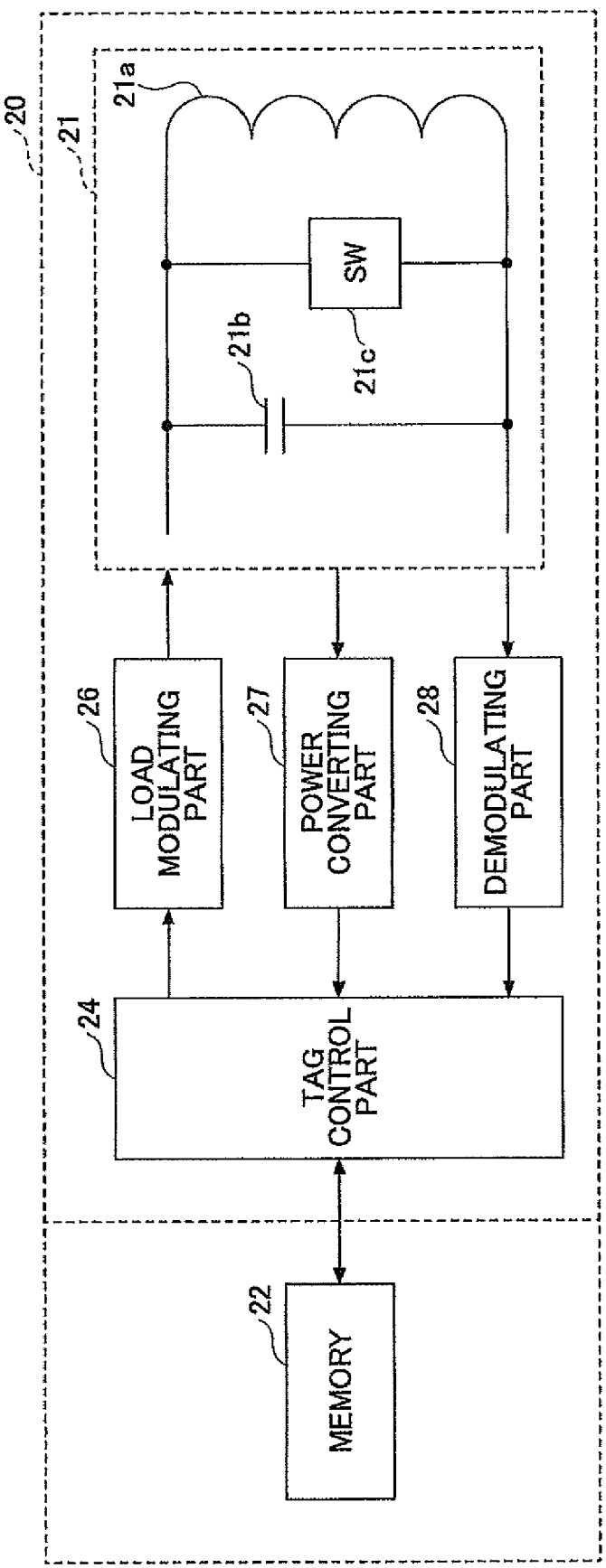
FIG. 2 is a schematic diagram for describing a configuration of an RFID tag according to a related art example.

Next, an RFID tag according to a related art example is described. FIG. 2 is a schematic diagram illustrating a configuration of an RFID tag 20 according to the related art example.

The RFID tag 20 includes an antenna part 21, a memory 22, a tag control part 24, a load modulating part 26, a power converting part 27, and a demodulating part 28. The antenna part 21 has a resonance condenser 21b and a switch 21c connected in parallel with an antenna coil 21a. In the antenna part 21, the resonant state between the resonance condenser 21b and the antenna coil 21a is altered by switching on/off the switch 21c. Accordingly, the resonance frequency between the antenna coil 21a and the resonance condenser 21b is changed, to thereby generate a response signal to be transmitted to the RFID reader/writer 10.

The memory 22 stores, for example, information received from the reader/writer 10. The tag control part 24 controls transmission and reception of information by the antenna part 21. The connection between the load modulating part 26 and the resonance condenser 21b is controlled by switching on/off the switch 21c. Accordingly, the resonance frequency between the load modulating part and the resonance condenser 21b is changed, to thereby generate a response signal to be transmitted to the RFID reader/writer 10. The power converting part 27 converts the carrier wave received from the RFID reader/writer 10 to electric power by converting the carrier wave to induced voltage by using magnetic flux and supplies the electric power into the RFID tag 20 for use as the power source of the RFID tag. The demodulating part 28 demodulates the target modulating wave received from the RFID reader/writer 10.

First Embodiment

The below-described communication apparatus according to an embodiment of the present invention is configured to provide a function of an RFID tag and a function of an RFID reader/writer and perform transferring and updating of data written to an RFID tag without using a dedicated reader/writer. Although, the below-described embodiment of the communication apparatus is applied to an image forming apparatus having multiple functions including, for example, a facsimile function, a copier function, and a printer function, the communication apparatus may be applied to other apparatus that can perform a function of an RFID reader/writer.

Figure 3:
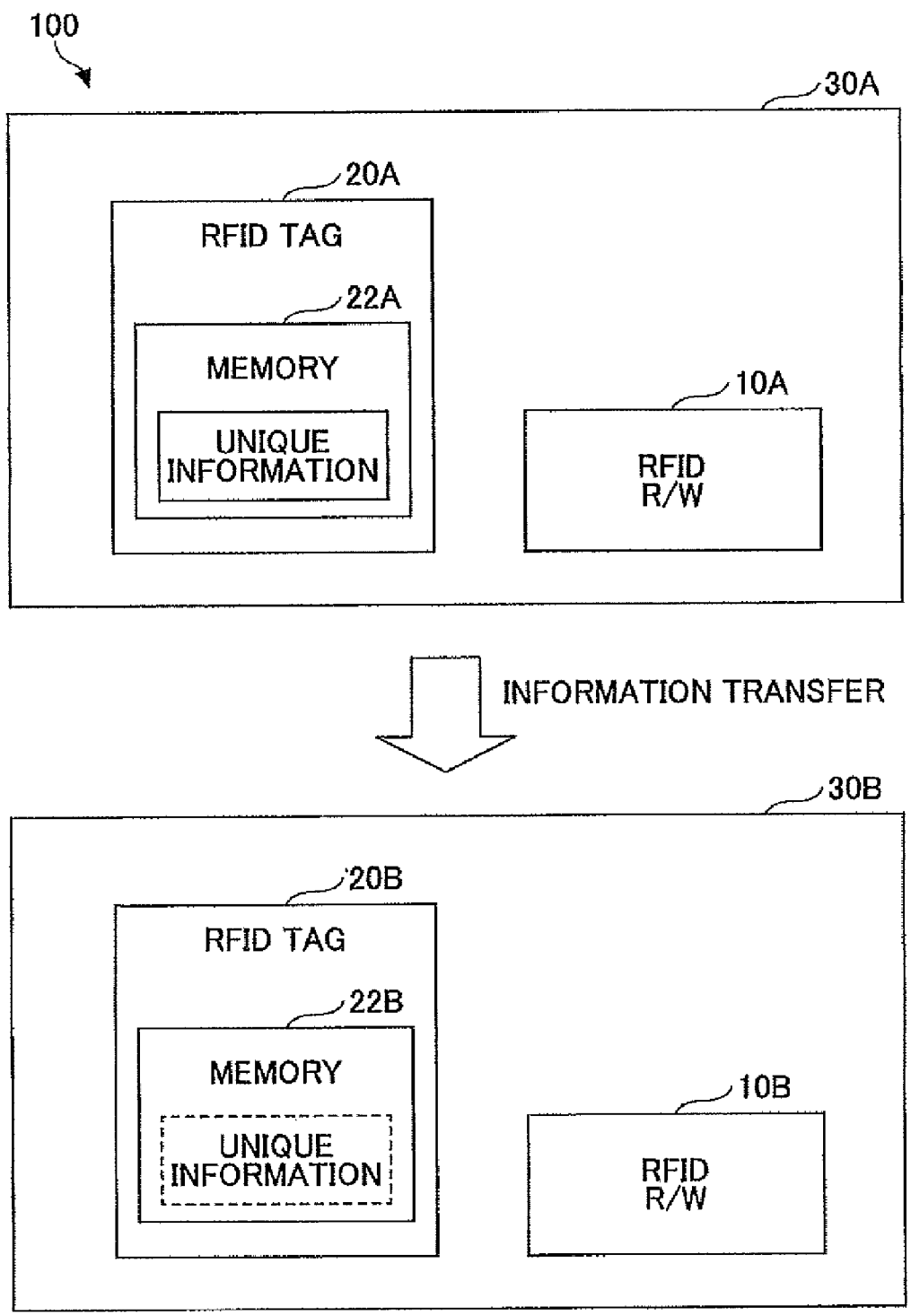
FIG. 3 is a schematic diagram illustrating an image forming apparatus according to an embodiment of the present invention.

Next, a first embodiment of an image forming apparatus 100 having the function(s) of the RFID reader/writer 10 and the function(s) of the RFID tag 20 is described with reference to FIG. 3. FIG. 3 is a schematic diagram illustrating the image forming apparatus 100 according to an embodiment of the present invention.

The image forming apparatus 100 has a substrate (communication apparatus) 30A on which an RFID reader/writer 10A and an RFID tag 20A are mounted. A memory 22A included in the RFID tag 20A stores information unique to the image forming apparatus 100 (hereinafter also referred to as "unique information"). The unique information includes, for example, address data registered in the image forming apparatus 100 and setting information unique to the user.

The image forming apparatus 100 having the substrate (communication apparatus) 30A mounted thereto is configured to operate the RFID reader/writer 10A in a case where power is supplied to the substrate 30A and operate the RFID tag 20A in a case where no power is supplied to the substrate 30A. In this embodiment, the image forming apparatus 100 can transfer unique information stored in the RFID tag 20A to another RFID reader/writer 10B mounted on another substrate (communication apparatus) 30B even in a case where power cannot be supplied to the substrate 30A due to failure in the substrate 30A.

For example, in a case where the substrate 30A is detached from the image forming apparatus 100 due to failure in the substrate 30A, the substrate 30A functions as the RFID tag 20A since no power is supplied to the substrate 30A. Accordingly, in a case where the substrate 30A is brought to the vicinity of the substrate 30B being supplied with power and operating as the RFID reader/writer 10B, the unique data stored in the memory 22A of the RFID tag 20A of the substrate 30A can be read out by the RFID reader/writer 10B of the substrate 30B. Accordingly, by writing the unique data read out from the memory 22A into a memory 22B of an RFID tag 20B with the RFID reader/writer 10B of the substrate 30B, the unique data read out from the memory 22A can be transferred from the substrate 30A to the substrate 30B. Thus, with the image forming apparatus 100 according to the above-described embodiment of the present invention, information written in an RFID tag can be transferred without having to use a separate dedicated reader/writer.

Figure 4:
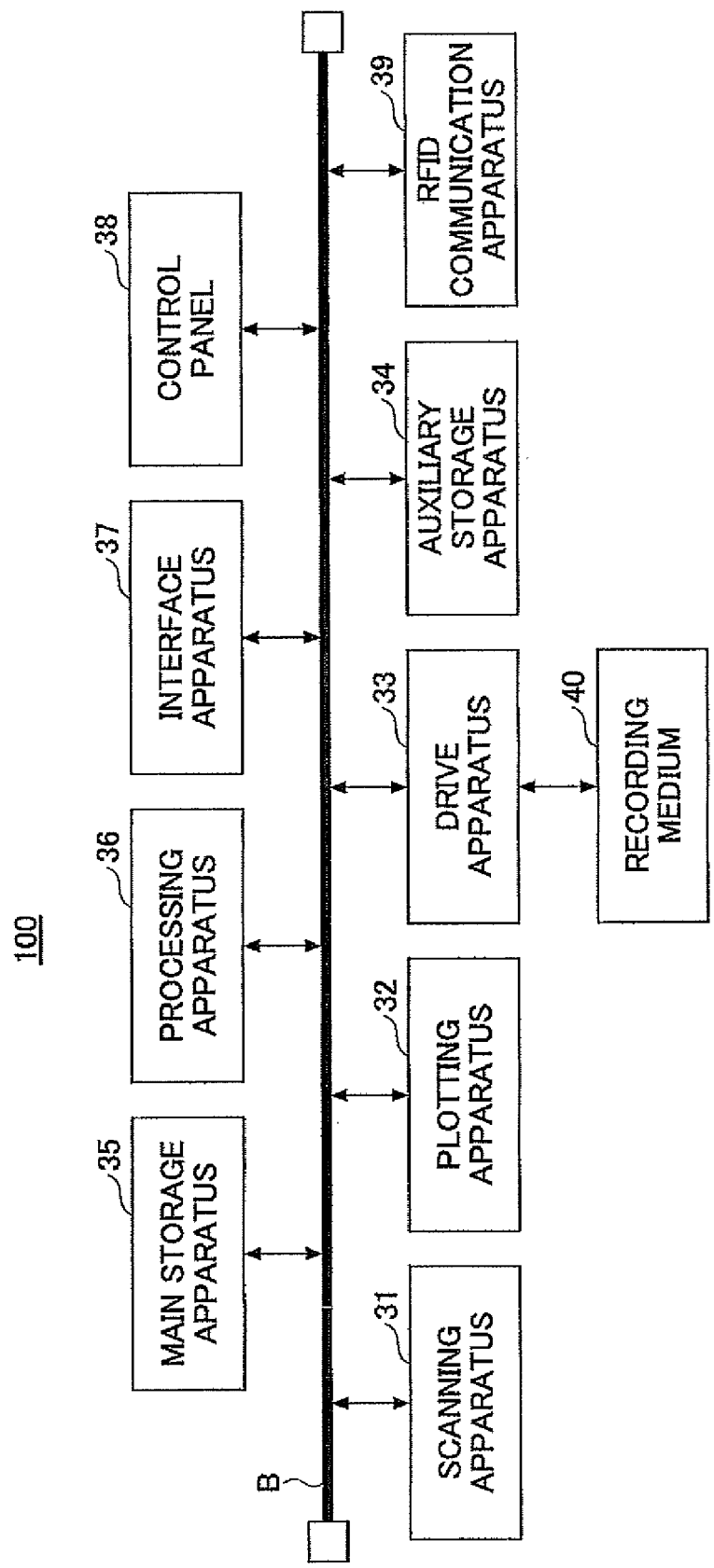
FIG. 4 is a schematic diagram illustrating a hardware configuration of an image forming apparatus according to an embodiment of the present invention.

FIG. 4 is a schematic diagram illustrating a hardware configuration of the image forming apparatus 100 according to an embodiment of the present invention.

The image forming apparatus 100 includes a scanning apparatus 31, a plotting apparatus 32, a drive apparatus 33, an auxiliary storage apparatus 34, a main storage apparatus (e.g., memory) 35, a processing apparatus (e.g., processor) 36, an interface apparatus 37, a control panel 38, and an RFID communication apparatus 39 that are connected to a bus B.

The scanning apparatus 31 includes, for example, a scanner engine and an engine controlling part for controlling the scanner engine. The scanning apparatus 31 is for reading image data from, for example, a paper document. The plotting apparatus 32 includes, for example, a plotter engine and an engine controlling part for controlling the plotter engine. The plotting apparatus 32 is for outputting image data. The interface apparatus 37 includes, for example, a modem and a LAN card. The interface apparatus 37 is for connecting the image forming apparatus 100 to a network. Accordingly, the image forming apparatus 100 can exchange (transmit and receive) information, for example, between other apparatuses existing in the same network as the image forming apparatus 100 or in other networks via the interface apparatus 37. The control panel 38 includes, for example, a touch panel. The control panel 38 displays, for example, operation keys of the image forming apparatus 100 and operation statuses of the image forming apparatus 100. The RFID communication apparatus 39 is for performing the below-described function(s) of an RFID reader/writer (RFID reader/writer function) and the below-described function(s) of an RFID tag (RFID tag function).

A communication program according to an embodiment of the present invention is one of the various programs for controlling the image forming apparatus 100. The communication program is provided by, for example, distribution of a recording medium (computer-readable recording medium) 40 or downloading from the network. The communication program is recorded to the recording medium 40. The recording medium 40 includes, for example, a recording medium configured to optically, electrically, or magnetically store information (e.g., CD-ROM, flexible disk, magneto-optic disk) or a semiconductor memory configured to electrically store information (e.g., ROM, flash memory).

By loading the recording medium 40 into the drive apparatus 33, the communication program recorded in the recording medium 40 can be installed in the auxiliary storage apparatus 34 via the drive apparatus 33.

The auxiliary storage apparatus 34 is for storing the communication program as well as, for example, files and data used for the image forming apparatus 100. The main storage apparatus 35 is for reading out the communication program from the auxiliary storage apparatus 34 and storing the communication program therein. The processing apparatus 36 is for executing the below-described various processes according to the communication program stored in the main storage apparatus 35.

Second Embodiment

Compared to the above-described first embodiment having the reader/writer 10B and the tag 20A mounted on the same substrate 30A, the below-described embodiments of a communication apparatus 200 can be fabricated with a smaller circuit size by providing a configuration having a memory 120 and an antenna part 160 that are shared by a reader/writer part 140 and a tag part 150 (described in detail below). Further, the below-described embodiments of the communication apparatus 200 can control the shared memory 120 and the shared antenna part 160 according to usage by providing a selecting part 130 for selecting the reader/writer part 140 or the tag part 150 for accessing the shared memory 120 and a correcting part C1-C4 for correcting a resonance frequency of the shared antenna part 160 (described in detail below). Further, the below-described embodiments can selectively operate either the RFID reader/writer part 140 or the tag part 150 when power is being supplied to the communication apparatus (substrate) 200, to thereby prevent the RFID tag part 150 from being damaged when power is being supplied to the communication apparatus 200 (described in detail below).

Figure 5:
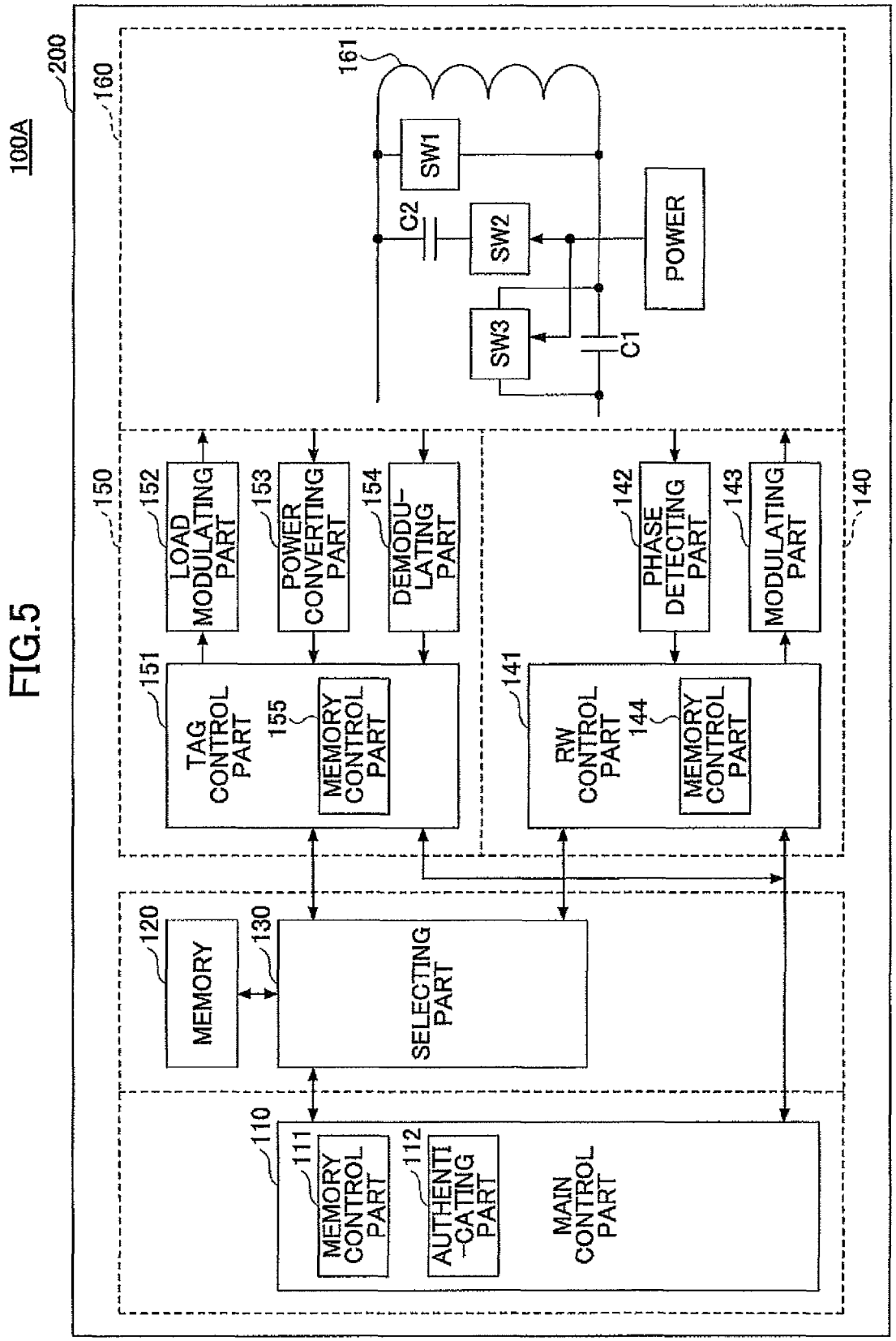
FIG. 5 is a block diagram illustrating a functional configuration of an image forming apparatus according to an embodiment of the present invention.

Next, a second embodiment of an image forming apparatus 100A is described. FIG. 5 is a block diagram illustrating a functional configuration of the image forming apparatus 100 including the communication apparatus (substrate) 200 according to an embodiment of the present invention.

The image forming apparatus 100A includes, for example, a main control part 110, a memory 120, a selecting part 130, a reader/writer (RW) part 140, a tag part 150, and an antenna part 160. In this embodiment, all of the parts 110-160 are mounted on the substrate (communication apparatus) 200.

The main control part 110 is for controlling the overall operations of the image forming apparatus 100A. The main control part 110 includes a memory control part 111 and an authenticating part 112. The memory control part 111 is for controlling reading/writing of data from/to the memory 120 via the selecting part 130. The authenticating part 112 is for authenticating an RFID tag in a case where the substrate 200 functions as a reader/writer.

The memory 120 includes a non-volatile memory, for example, EEPROM (Electronically Erasable and Programmable Read Only Memory) and FRAM (Fe Random Access Memory). The memory 120 is shared and used by the reader/writer part 140 and the tag part 150. The memory 120 may be included, for example, in the memory apparatus 35. The memory 120 stores, for example, information unique to the image forming apparatus 100A.

The selecting part 130 is for selecting either the reader/writer part 140 or the tag part 150 and allowing either the selected reader/writer part 140 or the tag part 150 to access the memory 120. In a case where power is being supplied to the substrate 200, the selecting part 130 selects the reader/writer part 140 and allows the reader/writer part 140 to access the memory 120. In a case where no power is being supplied to the substrate 200, the selecting part 130 selects the tag part 150 and allows the tag part to access the memory 120.

As long as the selecting part 130 is configured to allow the reader/writer part 140 to access the memory 120 where power is being supplied to the substrate 200 and allow the tag part 150 to access the memory 120 where no power is being supplied to the substrate 200, the configuration of the selecting part 130 is not limited to the configuration described in this embodiment. Due to such configuration of the selecting part 130, the memory 120 is used as a memory of the reader/writer part 140 where power is supplied to the substrate 200. Further, the memory 120 is used as a memory of the tag part 150 where power is not supplied to the substrate 200. Accordingly, in this embodiment, the memory 120 can be shared by the reader/writer part 140 and the tag part 150.

For example, the selecting part 130 may be configured as a diode. In this example, the selecting part 130 may be configured to disconnect the electric current flowing to the tag part 150 in a case where power is supplied to the substrate 200. The selecting part 130 may include a universal buffer capable of applying voltage to an input terminal of the buffer in a case where a power source of the buffer is switched off.

In another example, the selecting part 130 may be configured as a mechanical relay or a semiconductor relay that is switched on/off in correspondence with supplying of power. In this example, the selecting part 130 may be configured to switch off the mechanical relay or the semiconductor relay connecting the memory 120 and the tag part 150 in a case where power is supplied to the substrate 200. In a case of using the semiconductor relay, it is preferable that the semiconductor relay be capable of passing current in both directions.

In another example, the selecting part 130 may be configured to connect to the memory control part 111 or the below-described memory control parts 143, 155 by open drain connection or open collector connection. In this example, the selecting part 130 does not communicate with the plural memory control parts 111, 143, 155 at the same time but instead communicates with one of the memory control parts 111, 143, 155. Due to the open drain connection or the open collector connection, the memory 120 is connected to the reader/writer part 140 in a case where power is supplied to the substrate 200 and is connected to the tag part 150 in a case where power is not supplied to the substrate 200.

With the above-described exemplary configurations of the selecting part 130, the memory 120 can operate as a memory of the reader/writer part 140 while power being supplied to the tag part 150 is prevented in a case where power is supplied to the substrate 200. Accordingly, with the selecting part 130 according to the second embodiment, the memory 120 can be shared by the reader/writer part 140 and the tag part 150 while the tag part 150 is prevented from being damaged when power is being supplied to the substrate 200.

The reader/writer part 140 according to an embodiment of the present invention causes the substrate 200 to function as a reader/writer. The reader/writer part 140 is a first communication part capable of performing wireless communications with an outside RFID tag. The reader/writer part 140 includes, for example, a reader writer (RW) control part 141, a phase detecting part 142, and a modulating part 143. The reader writer control part 141 is for controlling operations of the reader/writer part 140. The reader/writer control part 141 also includes a memory control part 144. The memory control part 144 is for accessing the memory 120 via the selecting part 130.

The tag part 150 causes the substrate 200 to function as an RFID tag. The tag part 150 according to an embodiment of the present invention is a second communication part capable of performing wireless communications with an outside RFID reader/writer. The tag part 150 includes a tag control part 151, a load modulating part 152, a power converting part 153, and a demodulating part 154. The tag control part 151 is for controlling operations of the tag part 150. The tag control part 151 includes a memory control part 155. The memory control part 155 is for accessing the memory 120 via the selecting part 130.

The antenna part 160 is a shared antenna that is used by both the reader/writer part 140 and the tag part 150. The antenna part 160 includes an antenna coil 161, a condenser C1, a condenser C2, a first switch part SW1, a second switch part SW2, and a third switch part SW3. The condenser C1 and the third switch part SW3 are connected in parallel. This parallel circuit formed by the condenser C1 and the third switch part SW3 is connected in series with the antennal coil 161. The first switch part SW1 is connected in parallel with the antenna coil 161. The condenser C2 and the second switch part SW2 are connected in series; thus, a serial circuit is formed by the condenser C2 and the second switch part SW2.

In a typical case where communications are performed between an RFID reader/writer and an RFID tag, the resonance frequency desired for the RFID reader/writer and the resonance frequency desired by the RFID tag are not always the same. Accordingly, in a case where the antenna part 160 is shared simply by the reader/writer part 140 and the RFID tag 150, the difference of resonance frequencies between the reader/writer part 140 and the RFID tag 150 may cause communication difficulties. For example, in a case where the antennal coil 161 and the condenser C1 of the antenna part 160 are designed in accordance with the resonance frequency desired for the reader/writer part 150, communications cannot be properly performed in a case where the antenna part 160 is used as an antenna part of the tag part 150.

Typically, in a case where resonance frequency is expressed as "f", resonance frequency is determined according to the expression "$f=1/(2\pi\sqrt{(LC)})$". Thus, according to an embodiment of the present invention, a correcting part for correcting resonance frequency is provided in the antenna part 160, so that the resonance frequency can be corrected by changing the capacity of the condenser to which the antenna coil 161 (hereinafter also referred to as "condenser capacity C") according to the usage of the antenna part 160.

In the antenna part 160 according to an embodiment of the present invention, the antenna coil 161 and the condenser C1 are designed to correspond with the resonance frequency desired by the reader/writer part 140. Therefore, in a case where the antenna part 160 is used as the antenna part of the tag part 150, correction of the resonance frequency is preferred. According to an embodiment of the present invention, the resonance frequency is corrected by changing the condenser capacity C by switching the condenser connected to the antenna coil 161 with the second and third switching parts SW2, SW3. That is, the condenser connected to the antenna coil 161 is switched from the condenser C1 to the condenser C2, to thereby change the resonance frequency. Therefore, in this embodiment, the second and third switching parts SW2, SW3 function as a switching circuit, and the condenser C2 functions as a correcting part.

In this embodiment, the first switching part SW1 is switched off in a case where power is supplied to the substrate 200.

The second switching part SW2 is switched off (open) in a case where power is supplied to the substrate 200. The third switching part SW3 is switched off (open) in a case where power is supplied to the substrate 200.

Accordingly, since the first-third switching parts SW1-SW3 are switched off (open) in a case where power is supplied to the substrate 200, the antenna part 160 can function as a reader/writer by using the resonance frequency generated from the resonance circuit formed by the antennal coil 161 and the condenser C1.

In a case where no power is supplied to the substrate 200, the second and third switching parts SW2, SW3 of the antenna part 160 are switched on (shorted). Therefore, the antenna coil 161 is connected in parallel with the condenser C2. In this case, the condenser capacity (capacity of the condenser connected to the antenna coil 161) becomes the capacity of the condenser C2. Accordingly, the resonance frequency is corrected to be a frequency that is determined in correspondence with the capacity of the condenser C2. Accordingly, the antenna part 160 can function as an RFID tag by using the resonance frequency generated from the resonance circuit formed by the antenna coil 161 and the condenser C2.

The capacity of the condenser C1 and the capacity of the condenser C2 are determined in correspondence with the resonance frequency desired for the reader/writer part 140 and the resonance frequency desired for the tag part 150, respectively.

Accordingly, with the above-described embodiment of the present invention, the difference of the resonance frequencies between a case where the reader/writer part 140 uses the antenna part 160 and a case where the tag part 150 uses the antenna part 160 can be corrected. Thus, the antenna part 160 can be shared by the reader/writer part 140 and the tag part 150.

Although the antenna part 160 in the above-described embodiment of the present invention is designed in correspondence with the resonance frequency desired by the reader/writer part 140, the antenna part 160 may be designed in correspondence with the resonance frequency desired by the tag part 150. In this case where the antenna part 160 is designed in correspondence with the resonance frequency desired by the tag part 150, the switching parts SW2, SW3 are controlled to switch off (open) when power is supplied to the substrate 200 and to switch on (shorted) when no power is supplied to the substrate 200. Further, in this case, the condenser C1 functions as a correcting part. The switching parts SW1 through SW3 include, for example, semiconductor relays.

With the image forming apparatus 100A including the selecting part 130 and the correcting part according to the above-described embodiment of the present invention, the memory 120 and the antenna part 160 can be shared by the reader/writer part 140 and the tag part 150. Since the memory 120 and the antenna part 160 can be shared by the reader/writer part 140 and the tag part 150, the function of a reader/writer and the function of a tag can be realized on a single substrate 200 without having to increase the circuit size.

Figure 6:
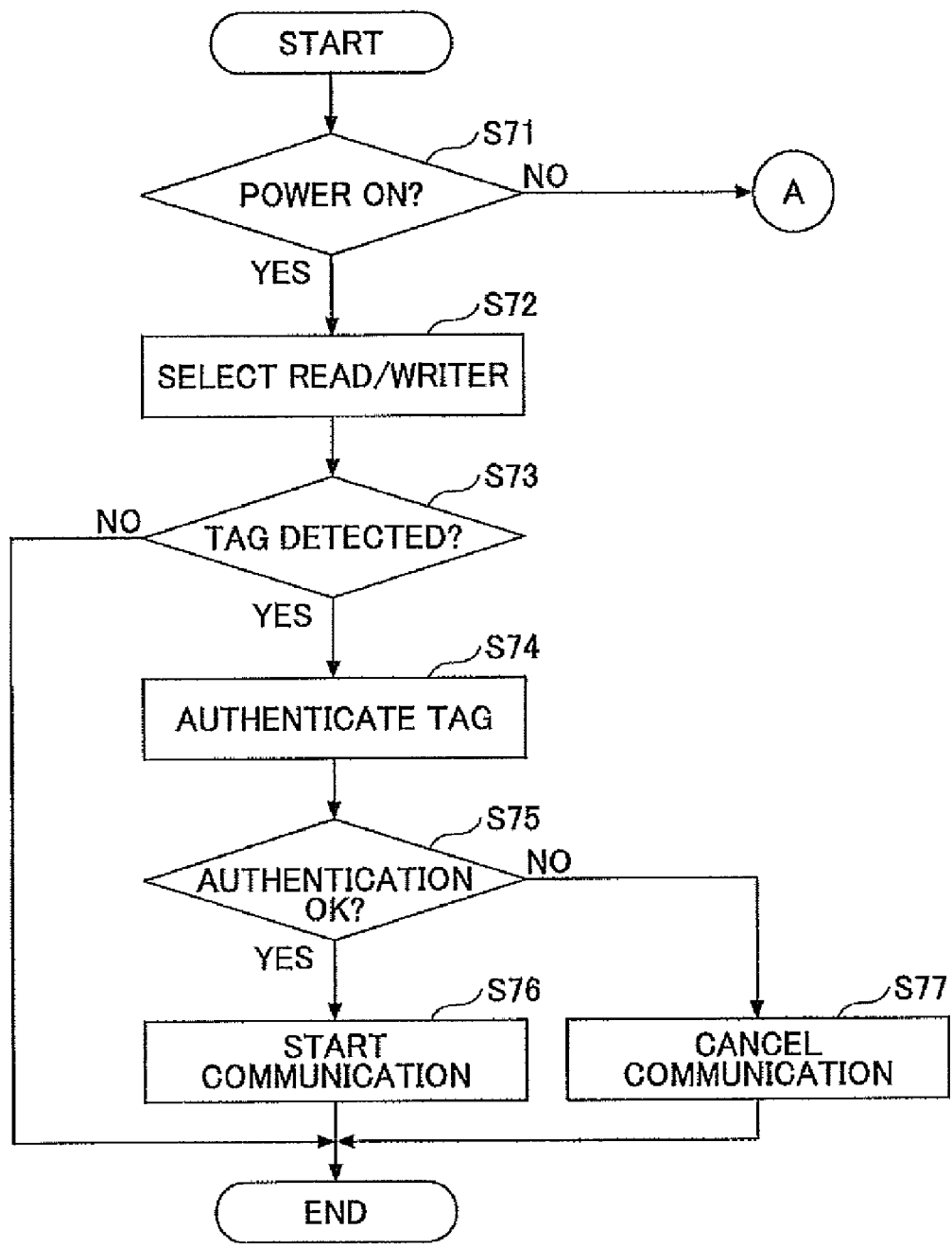
FIG. 6 is a flowchart for describing an operation of an image forming apparatus in a case where power is supplied to a substrate according to an embodiment of the present invention.

Next, operations of the image forming apparatus 100A according to an embodiment of the present invention are described. First, an example of an operation of the image forming apparatus 100A in a case where power is supplied to the substrate 200 is described. FIG. 6 is a flowchart for describing the operation of the image forming apparatus 100A in a case where power is supplied to the substrate 200.

In a case where power is supplied to the substrate 200 (Yes in Step S71), the reader/writer part 140 is selected (Step S72). More specifically, the selecting part 130 selects the reader/writer part 140 so that power is supplied only to the reader/writer part 140, to thereby allow access to the reader/writer part 140 and the memory 120. Further, the supply of power causes the switching parts SW1, SW2, SW3 in the antenna part 160 to be switched off (open), and the resonance frequency of the antenna part 160 is determined in correspondence with the resonance frequency desired for the reader/writer part 140. Thereby, the substrate 200 can perform the function of the reader/writer part 140.

Then, in a case where an RFID tag or an apparatus (substrate) having the function of an RFID tag (for the sake of convenience, also referred to as "RFID tag" or simply as "tag" such as in FIG. 6) is located within a distance detectable by the antenna part 160 of the substrate 200, the reader/writer part 140 detects the RFID tag by using the phase detecting part 142 (Step S73). When the reader/writer part 140 detects the presence of the RFID tag (Yes in Step S73), the reader/writer control part 141 reports the detection of the RFID tag (detection report) to the main control part 110.

When the main control part 110 receives the detection report, the main control part 110 performs authentication by using the authenticating part 112 in order to determine whether communications can be performed with respect to the detected RFID tag (Step S74). The authenticating part 112 instructs the reader/writer control part 141 to have a query signal transmitted from the antenna part 160 via the modulating part 143 to the detected RFID tag for performing the authentication. In response to the query signal, the detected RFID tag transmits a response signal to the antenna part 160. The phase detecting part 142 detects the response signal received by the antenna part 160 and sends the response signal to the reader/writer control part 141. Then, the reader/writer control part 141 sends the response signal to the main control part 110. In a case where the response signal is authenticated (YES in Step S75), the main control part 110 starts communication with the RFID tag (Step S76). In a case where the response signal is not authenticated (NO in Step S76), the main control part 110 cancels communication with the RFID tag (Step S77). The case where the response signal is not authenticated includes, for example, a case where the RFID tag is a substrate mounted on an apparatus other than the image forming apparatus 100A. The results of the authentication by the authenticating part 112 may be displayed on the control panel 38 of the image forming apparatus 100A.

When the main control part 110 starts communication with the RFID tag, the memory control part 111 of the main control part 110 and the memory control part 144 of the reader/writer control part 141 can access the memory 120 via the selecting part 130. Accordingly, the reader/writer part 141 can store the response signal received by the antenna part 160 in the memory 120, and the main control part 110 can perform various processes by using the response signal stored in the memory 120. Further, the reader/writer part 141 can transmit data stored in the memory 120 from the antenna part 160 via the modulating part 143 and write data onto an outside RFID tag.

Figure 7:
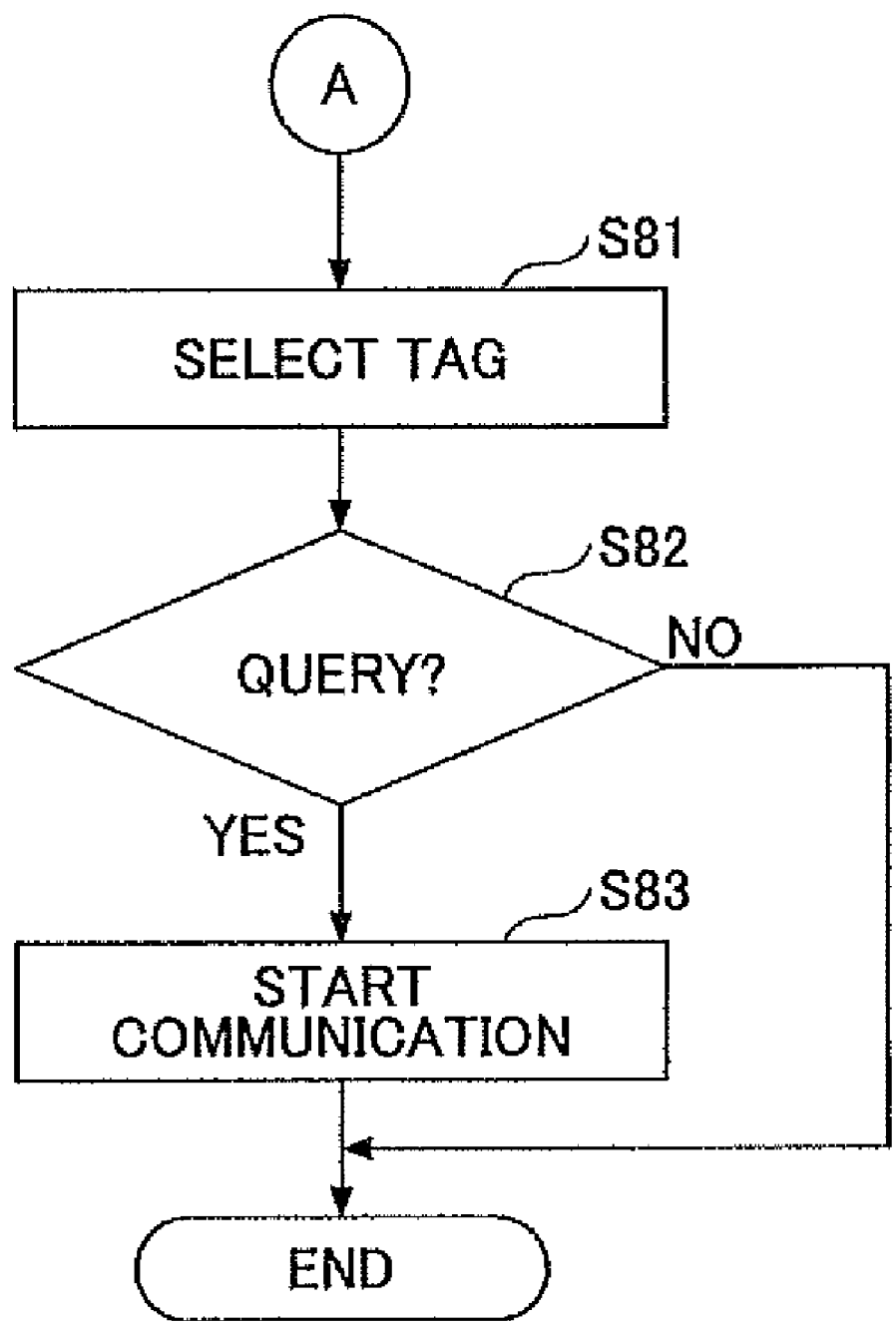
FIG. 7 is another flowchart for describing an operation of an image forming apparatus in a case where power is supplied to a substrate according to an embodiment of the present invention.

Next, an example of an operation of the image forming apparatus 100A in a case where no power is supplied to the substrate 200 is described with reference to FIGS. 6 and 7. FIG. 7 is a flowchart for describing the operation of the image forming apparatus 100A in a case where power is supplied to the substrate 200.

In a case where no power is supplied to the substrate 200 (No in Step S71 of FIG. 6), the tag part 150 is selected (Step S81). More specifically, the selecting part 130 selects the tag part 150 so as to connect the tag part 150 and the memory 120 and allow access to the tag part 150 and the memory 120. In this case, the switching parts SW2, SW3 in the antenna part 160 are switched on (shorted), and the resonance frequency of the antenna part 160 is determined in correspondence with the resonance frequency desired for the tag part 150. Thereby, the substrate 200 can perform the function of the tag part 150.

Then, in a case where an RFID tag or an apparatus (substrate) having the function of an RFID tag (for the sake of convenience, referred to as "RFID tag" or as "tag" such as in FIG. 7) is located within a distance detectable by the antenna part 160 of the substrate 200, the tag part 150 uses the electromotive force generated by the induced magnetic flux of the antenna part 160 by using the power converting part 153. Further, the tag part 150 determines whether there are any query signals transmitted from, for example, an RFID reader/writer from another apparatus (Step S82). For example, the tag part 150 uses the modulating part 154 to demodulate a target modulated wave transmitted from the RFID reader/writer and received by the antenna part 16 and send a demodulated signal to the tag control part 151.

When the query signal from the RFID reader/writer is received, the tag part 150 starts communication (Step S83). For example, the tag part 150, upon the reception of the query signal, accesses the memory 120 by using the memory control part 155 of the tag control part 151. The memory control part 155 reads data stored in the memory 120. The load modulating part 152 modulates the read data onto a signal that can be transmitted from the antenna part 160. The antenna part 160 transmits the modulated signal as a response signal to the RFID reader/writer. In this embodiment, the tag part 150 does not perform communications in a case where no query signal from an RFID reader/writer is transmitted.

With the above-described operations, the memory 120 and the antenna coil 161 can be shared by controlling the access of the reader/writer part 140 and the tag part 150 with respect to the memory 120 and correcting the resonance frequency of the antenna part 160. Accordingly, the function of an RFID reader/writer and the function of an RFID tag can be realized without having to increase the circuit size. Thus, data written in a tag can be transferred without having to use a dedicated reader/writer for transferring such data.

Modified Example

Next, a modified example of the antenna part 160 is described. Although the antenna part 160 of the above-described embodiment of the present invention is configured so that the capacity of the condenser C1 is determined in correspondence with the resonance frequency desired by the reader/writer part 140 and the capacity of the condenser C2 is determined in correspondence with the resonance frequency desired by the tag part 150, the antenna part 160 is not limited to such configuration. In one modified example of the antenna part 160, a separate circuit that determines resonance frequency may be provided in the antenna part 160 for changing condenser capacity C. This modified example is described below.

Figure 8A:
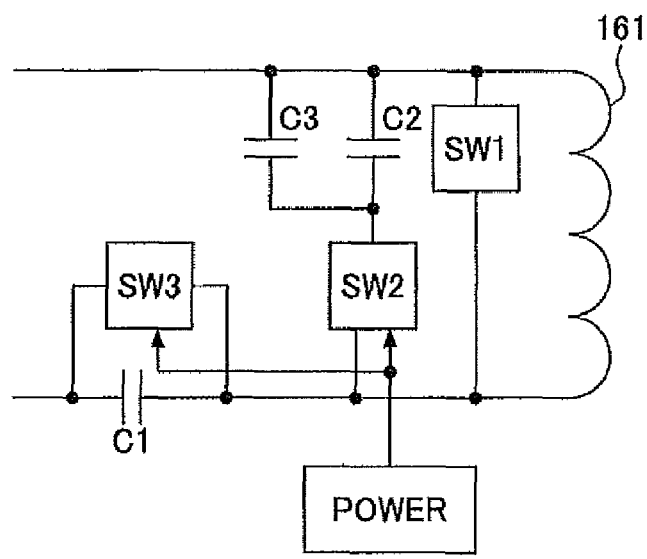
FIG. 8A is a schematic diagram illustrating an example where a resonance frequency is reduced by correction of the resonance frequency according to an embodiment of the present invention.
Figure 8B:
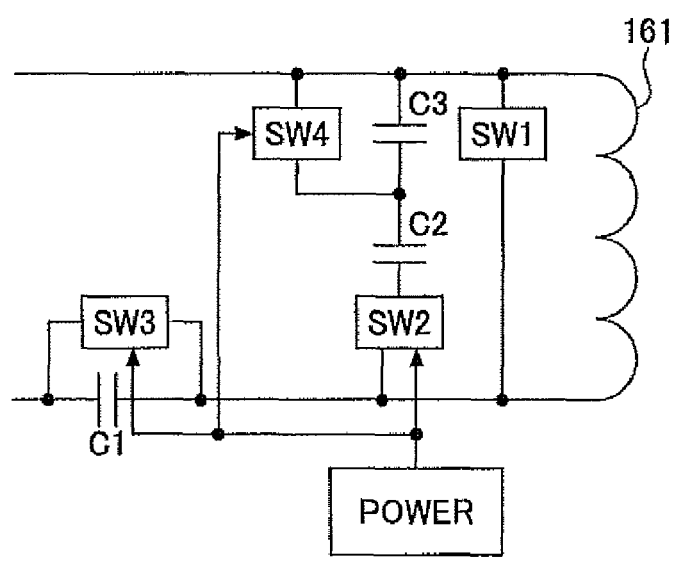
FIG. 8B is a schematic diagram illustrating an example where the resonance frequency is increased by correction of the resonance frequency according to an embodiment of the present invention.

FIGS. 8A and 8B are schematic diagrams for describing examples of the antenna part 160 (160A, 160B) in which the antenna part 160 is designed in correspondence with the resonance frequency desired by the reader/writer part 140. FIG. 8A illustrates an example where the resonance frequency is reduced by correction of resonance frequency. FIG. 8B illustrates an example where the resonance frequency is increased by correction of the resonance frequency.

In FIG. 8A, an antenna part 160A has a condenser C3 connected in parallel with a condenser C2. In the antenna part 160A, the switching parts SW1, SW2, SW3 are switched off (open) in a case where power is supplied to the substrate 200. Accordingly, the antenna coil 161 is connected to the condenser C1.

In this case, the condenser capacity C serving as the parameter for determining the resonance frequency of the antenna part 160A is the capacity of the condenser C1 (hereinafter referred to as "condenser capacity Ca"). Therefore, the antenna part 160A acting as a reader/writer performs communications by using the resonance frequency determined by the condenser capacity Ca.

In the antenna part 160A, the switching parts SW2, SW3 are switched on (shorted) in a case where no power is supplied to the substrate 200. In this case, the condenser capacity C serving as the parameter for determining the resonance frequency of the antenna part 160A is the capacity of the condenser C2 (hereinafter referred to as "condenser capacity Cb") combined with the capacity of the condenser C3 (hereinafter referred to as "condenser capacity Cc") (Cb+Cc). Therefore, the antenna part 160A acting as a tag performs communication by using the resonance frequency determined by the condenser capacity (Cb+Cc).

In FIG. 8B, an antenna part 160B has a condenser C3 connected in series with a condenser C2. Further, the condenser C3 is connected in parallel with the switching part SW4. In the antenna part 160B, the switching parts SW1, SW2, SW3, SW4 are switched off (open) in a case where power is supplied to the substrate 200.

In this case, the condenser capacity C serving as the parameter for determining the resonance frequency of the antenna part 160B is the capacity of the condenser C1 (i.e. condenser capacity Ca). Therefore, the antenna part 160B acting as a reader/writer performs communications by using the resonance frequency determined by the condenser capacity Ca.

In the antenna part 160B, the switching parts SW2, SW3, SW4 are switched on (shorted) in a case where no power is supplied to the substrate 200. Accordingly, the antenna coil 161 is connected to the serial circuit formed by condensers C2 and C3.

In this case, the condenser capacity C serving as the parameter for determining the resonance frequency of the antenna part 160B is the combined capacity of the condenser C2 and the condenser C3 ((Cb×Cc)/(Cb+Cc)). Therefore, the antenna part 160B acting as a tag performs communications by using the resonance frequency determined by the condenser capacity ((Cb×Cc)/(Cb+Cc)).

With the exemplary configurations of the antenna parts 160A, 160B illustrated in FIG. 8a and FIG. 8, the resonance frequency can be corrected by the condenser C3 even in a case where the capacity of the condenser C1 and the capacity of the condenser C2 are substantially equal.

Figure 9A:
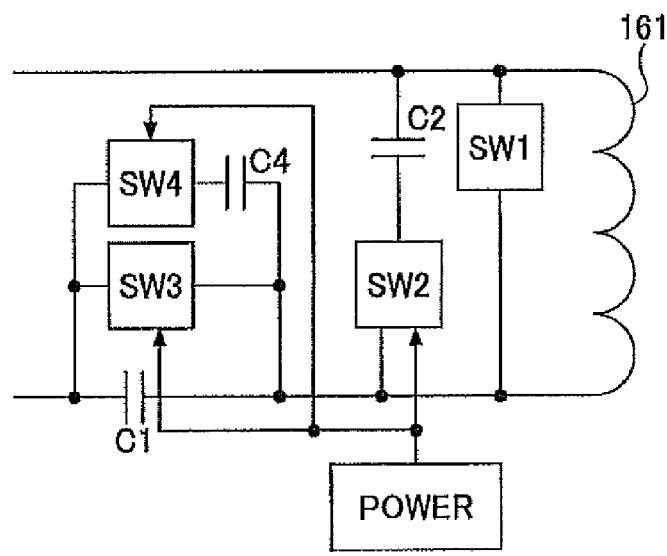
FIG. 9A is a schematic diagram illustrating an example where the resonance frequency is reduced by correction of the resonance frequency according to another embodiment of the present invention.
Figure 9B:
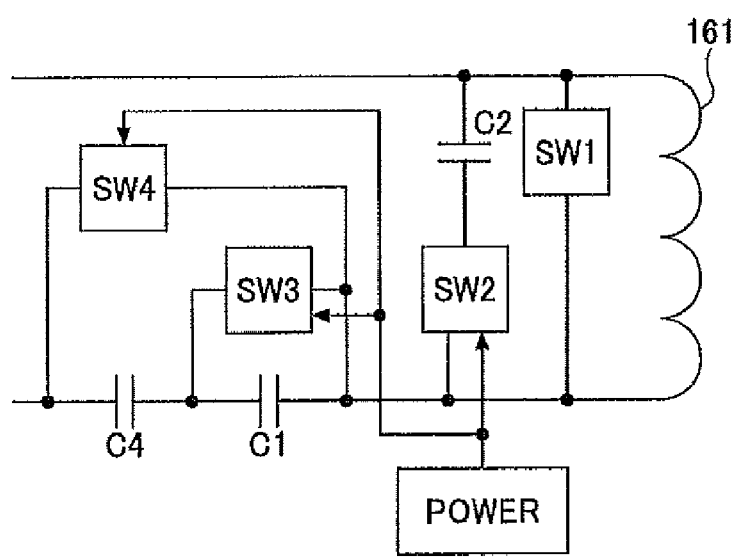
FIG. 9B is a schematic diagram illustrating an example where the resonance frequency is increased by correction of the resonance frequency according to another embodiment of the present invention.

FIGS. 9A and 9B are schematic diagrams for describing examples of the antenna part 160 (160C, 160D) in which the antenna part 160 is designed in correspondence with the resonance frequency desired for the tag part 150. FIG. 9A illustrates an example where resonance frequency is reduced by correction of resonance frequency. FIG. 9B illustrates an example where resonance frequency is increased by correction of resonance frequency.

In FIG. 9A, an antenna part 160C has a condenser C1 connected in parallel with a serial circuit formed of a condenser C4 and a switching part SW4. In the antenna part 160C, the switching parts SW1, SW2, SW3 are switched off (open) in a case where power is supplied to the substrate 200. Further, the switching part SW4 is switched on (shorted).

In this case, the condenser capacity C serving as the parameter for determining the resonance frequency of the antenna part 160C is the combined capacity of the capacity of the condenser C1 and the capacity of the condenser C4 (hereinafter referred to as "condenser capacity Cd") (Ca+Cd). Therefore, the antenna part 160C acting as a reader/writer performs communications by using the resonance frequency determined by the condenser capacity (Ca+Cd).

In the antenna part 160C, the switching parts SW2, SW3 are switched on (shorted) in a case where no power is supplied to the substrate 200. Further, the switching part SW4 is switched off (open). Accordingly, the antenna coil 161 is connected in parallel with the condenser C2.

Therefore, the antenna part 160C acting as a tag performs communications by using the resonance frequency determined by the capacity of the condenser C2 (i.e. capacity Cb).

In FIG. 9B, an antenna part 160D has a condenser C1 connected in series with a condenser C4, and a switching part SW4 connected in parallel with the serial circuit formed of the condensers C1 and C4.

In the antenna part 160D, the switching parts SW1, SW2, SW3, SW4 are switched off (open) in a case where power is supplied to the substrate 200. Accordingly, the antenna coil 161 is connected to the serial circuit formed of the condensers C1 and C4. Accordingly, the antenna part 160D acting as a reader/writer performs communications by using the resonance frequency determined by the combined capacity of the capacity of the condenser C1 and the capacity of the condenser C4 ((Ca×Cd)/(Ca+Cd)).

In the antenna part 160D, the switching parts SW2, SW3, SW4 are switched on (shorted) in a case where no power is supplied to the substrate 200. Accordingly, the antenna part 160D acting as a tag performs communications by using the resonance frequency determined by the capacity of the condenser C2 (i.e. condenser capacity Cb).

Third Embodiment

Next, a third embodiment of an image forming apparatus 100B is described. In the drawings of the third embodiment, like components/parts are denoted by like reference numerals as of the above-described embodiments and are not further explained. FIG. 10 is a block diagram illustrating a functional configuration of the image forming apparatus 100B according to the third embodiment of the present invention.

The image forming apparatus 100B includes, for example, a main control part 110A, a memory 120, a selecting part 130, a reader/writer (RW) part 140, a tag part 150, and an antenna part 160. In this embodiment, all of the parts 110A-160 are mounted on a substrate (communication apparatus) 200. The main control part 110A is for controlling the recording of data in the memory 120 and for managing the data recorded in the memory 120.

Figure 11:
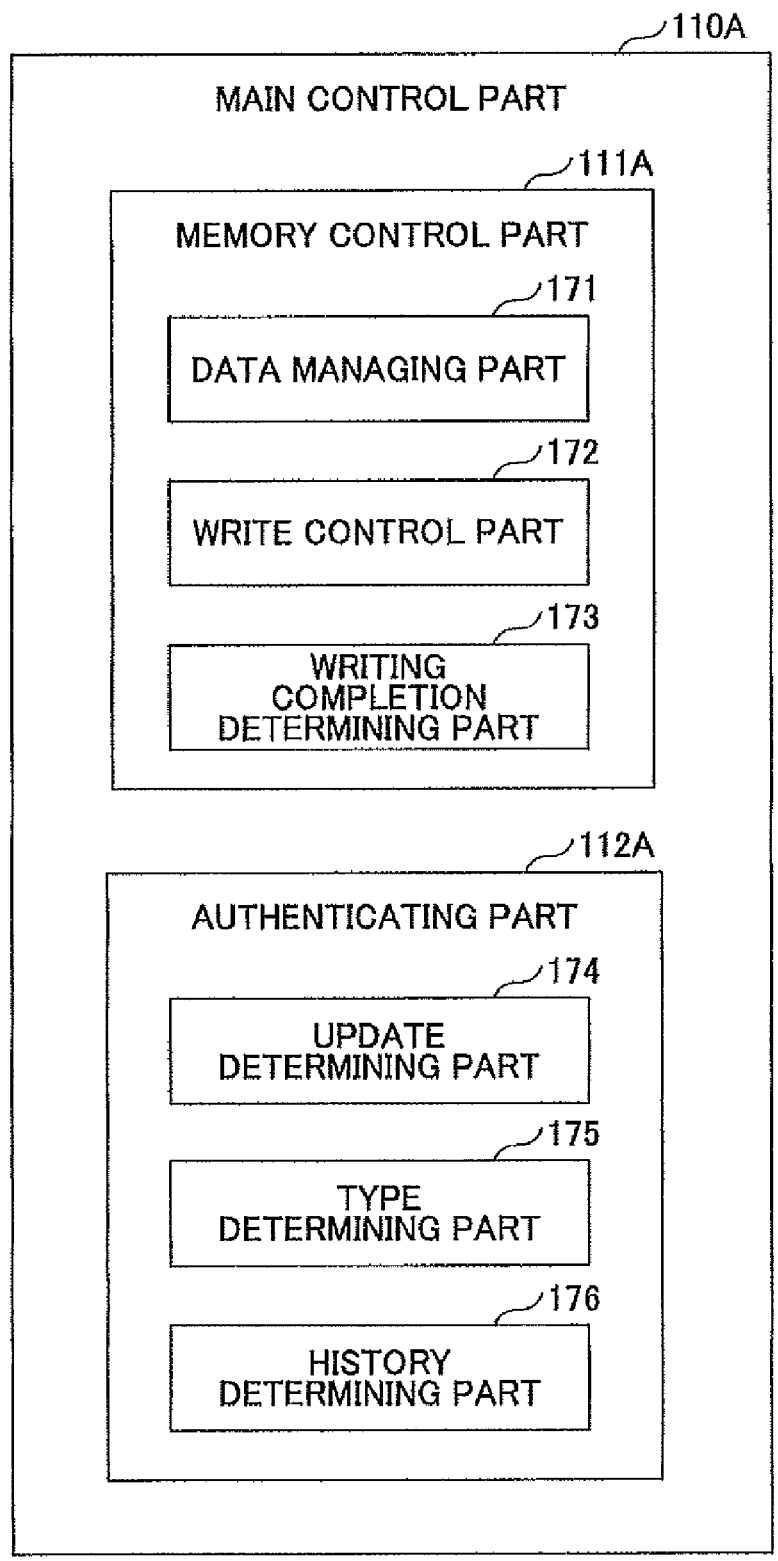
FIG. 11 is a schematic diagram illustrating a functional configuration of a main control part according to another embodiment of the present invention.

The functions of the main control part 110A are described in further detail below. FIG. 11 is a schematic diagram illustrating a functional configuration of the main control part 110A according to an embodiment of the present invention.

The main control part 111A includes a memory control part 111A and an authenticating part 112A. The memory control part 111A is for controlling reading/writing of data from/to the memory 120 via the selecting part 130. Further, the memory control part 111A includes, for example, a data managing part 171, a write control part 172, and a writing completion determining part 173.

The data managing part 171 is for managing data recorded in the memory 120. For example, the data managing part 171 manages the data recorded in the memory 120 in a manner such that history data regarding operation of the image forming apparatus 100B and user data regarding the user using the image forming apparatus 100B are managed separately. By managing the data in such a manner, unauthorized transfer of data or erroneous transfer of data can be prevented.

According to an embodiment of the present invention, the history data include, for example, the number of sheets scanned by the scanning apparatus 31 of the image forming apparatus 100B, the number of sheets output by the plotting apparatus 32, or the number of times of resupplying a consumable (e.g., ink cartridge). Further, the user data include, for example, information regarding a destination (address) list registered by the user of the image forming apparatus 100B, information regarding settings of the display panel 38, or information regarding a user interface (not shown).

The write control part 172 is for controlling writing of history data and/or user data in the memory 120. The controlling of data writing by the write control part 172 is described in detail below. The writing completion determining part 173 determines whether data are properly written in the memory 120 by the write control part 172. In a case where data are properly written by the write control part 172, the writing completion determining part 173 determines that writing of data is completed.

In a case where a substrate 200A functions as a reader/writer, the authenticating part 112A performs authentication on an RFID tag. The authenticating part 112A includes, for example, an update determining part 174, a type determining part 175, and a history determining part 176.

The update determining part 174 is for determining whether data recorded in the memory 120 can be updated. For example, update data including the history indicating updating of data (update history) are stored in the memory 120. The update determining part 174 refers to the update data stored in the memory 120 and determines whether data can be updated. If there is any update history, that is, if data are updated even for a single time, the update determining part 174 determines that data cannot be updated. In a case where there is no update history, the update determining part 174 determines that data can be updated.

In a case where an RFID tag is detected by the phase detecting part 142 of the reader/writer part 140, the type determining part 175 determines the type of apparatus on which the detected RFID tag is mounted. For example, the type determining part 175 analyzes a response wave from the detected RFID tag and determines the type of apparatus having the detected RFID tag mounted thereon based on type identifying data included in the response wave, to thereby determine whether the communication apparatus 200 is the same type as the type of the apparatus on which the detected RFID tag is mounted.

The history determining part 176 is for determining whether there is any history indicating writing of data to the memory. For example, the history determining part 176 refers to the memory 120 and determines whether there is any history indicating writing of data to the memory by the reader/writer part 140.

Figure 12:
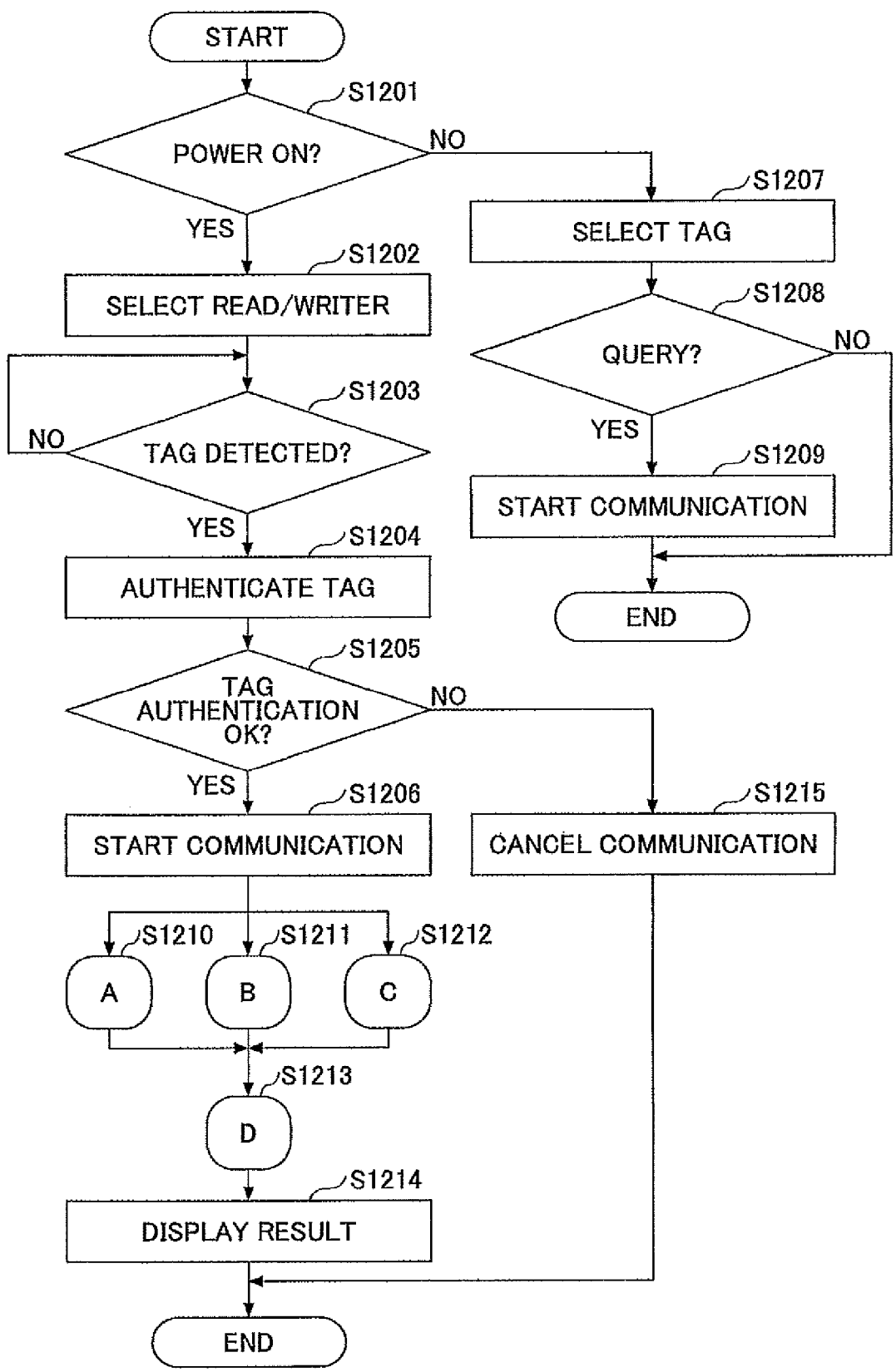
FIG. 12 is a flowchart for describing an operation of a substrate according to another embodiment of the present invention.

Next, operations of the substrate 200A according to an embodiment of the present invention are described. FIG. 12 is a flowchart for describing the operation of the substrate 200A.

Because the processes performed in Steps S1201 through S1206 of FIG. 12 are substantially the same as those performed in Steps S71 through S76 of FIG. 6, Steps S1201 through S1206 are not further described. Because the processes performed in Steps S1207 through S1209 of FIG. 12 are substantially the same as those performed in Steps S81 through S83 of FIG. 7, Steps S1207 through S1209 are not further described.

When communication is started in Step S1206, the main control part 110A performs the processes of Steps S1210, S1211, and S1212 (described in detail below). In this embodiment, the main control part 110A may perform the processes of Steps S1210, S1211, and S1212 in parallel. Next, the processes of Steps S1210, S1211, and S1212 are described in further detail with reference to FIGS. 13 through 15.

Figure 13:
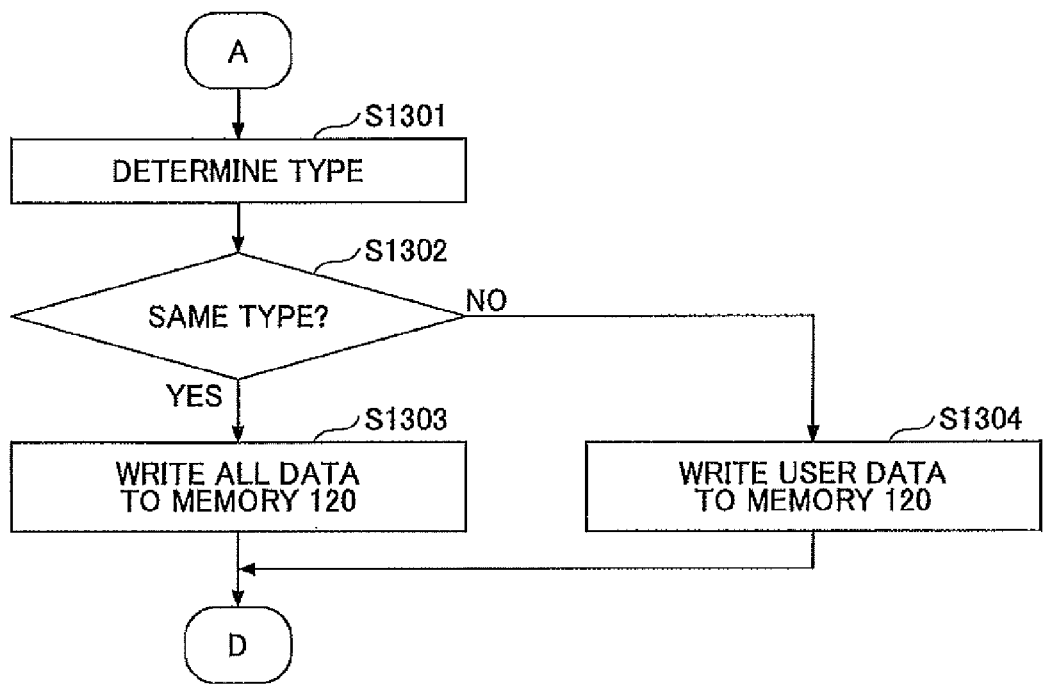
FIG. 13 is a flowchart for describing an operation A according to an embodiment of the present invention.

First, an operation in Step S1207 is described with reference to FIGS. 12 and 13. When communication is started in Step S1206, the main control part 110A starts operation A (Step S1210). FIG. 13 illustrates a flowchart for describing the operation A.

When communication is started, the authenticating part 112A of the main control part 110A refers to type identification data included in the received response wave and determines the type of apparatus on which a detected RFID is mounted (hereinafter referred to as "apparatus A") by using the type determining part 175 (Step S1301).

The authenticating part 112A determines whether the image forming apparatus 100B is the same type as the apparatus A according to the determination result of Step S1301 (Step S1302). The type identification data used for distinguishing the type of the image forming apparatus 100B may be stored in the memory 120. For example, the authenticating part 112A may determine whether the image forming apparatus 100B is the same type as the apparatus A by comparing the type identification data stored in the memory 120 and the type identification data included in the response wave.

In a case where the image forming apparatus 100B is the same type as the apparatus A (Yes in Step S1302), the write control part 172 of the memory control part 111A writes (records) the data read from the apparatus A to the memory 120 by using the reader/writer part 140 (Step S1303).

For example, in a similar manner as the data stored in the memory 120 of the image forming apparatus 100B, the data read from the apparatus A may include history data and user data. In a case where the image forming apparatus 100B is the same type as the apparatus A (Yes in Step S1302), the write control part 172 may write all the read data including history data and user data to the memory 120.

In a case where the image forming apparatus 100B is not the same type as the apparatus A (No in Step S1302), the write control part 172 writes, for example, the user data included in the data read from the apparatus A to the memory 120 (Step S1304).

After the writing of data in Steps S1303 or S1304 is completed, the operation of FIG. 13 proceeds to D which corresponds to Step S1213 of FIG. 12. The operation of S1213 is described below.

Accordingly, in the above-described embodiment of the present invention, history data of the image forming apparatus are not written to the memory 120 in the case where the image forming apparatus 100B is not the same type as the apparatus A. Therefore, no history data of an apparatus of a different type are recorded to the memory 120. Thus, history data of a different type of apparatus can be prevented from being transferred to the image forming apparatus 100B.

Figure 14:
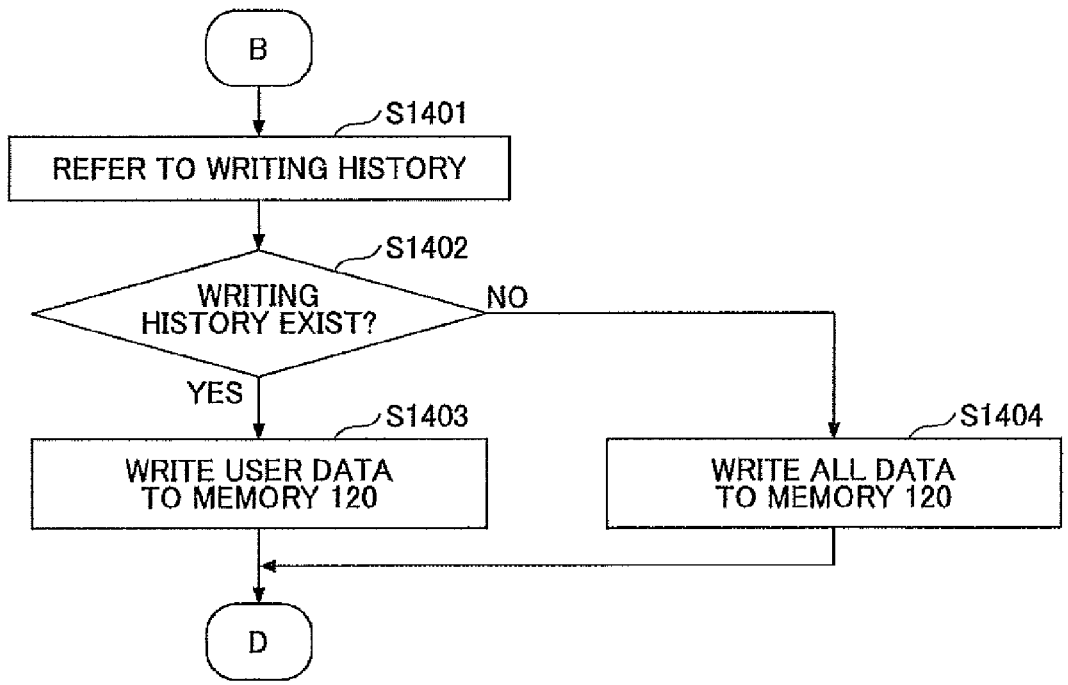
FIG. 14 is a flowchart for describing an operation B according to an embodiment of the present invention.

Next, an operation in Step S1211 is described with reference to FIGS. 12 and 14. When communication is started in Step S1206, the main control part 110A starts operation B (Step S1211). FIG. 14 illustrates a flowchart for describing the operation B.

When communication is started, the authenticating part 112A of the main control part 110A refers to the memory 120 (Step S1401) and determines whether there is any recording history (writing history) indicating that data read from the apparatus A have been recorded (written) to the memory 120 by using the history determining part 176 (Step S1402). In a case where the history determining part 176 determines that recording history exists in the memory (Yes in Step S1402), the write control part 172 of the memory control part 111A writes, for example, the user data included in the data read from the apparatus A to the memory 120 (Step S1403).

In a case where the history determining part 176 determines that no recording history exists in the memory (No in Step S1402), the write control part 172 of the memory control part 111A writes all the data read from the apparatus A including history data and user data to the memory 120 (Step S1404).

After the writing of data in Steps S1403 or S1404 is completed, the operation of FIG. 14 proceeds to D which corresponds to Step S1213 of FIG. 12. The operation of S1213 is described below.

Accordingly, in the above-described embodiment of the present invention, history data of the image forming apparatus are not written to the memory 120 in the case where recording history already exists in the memory 120. Therefore, history data can be prevented from being erroneously redundantly recorded.

Figure 15:
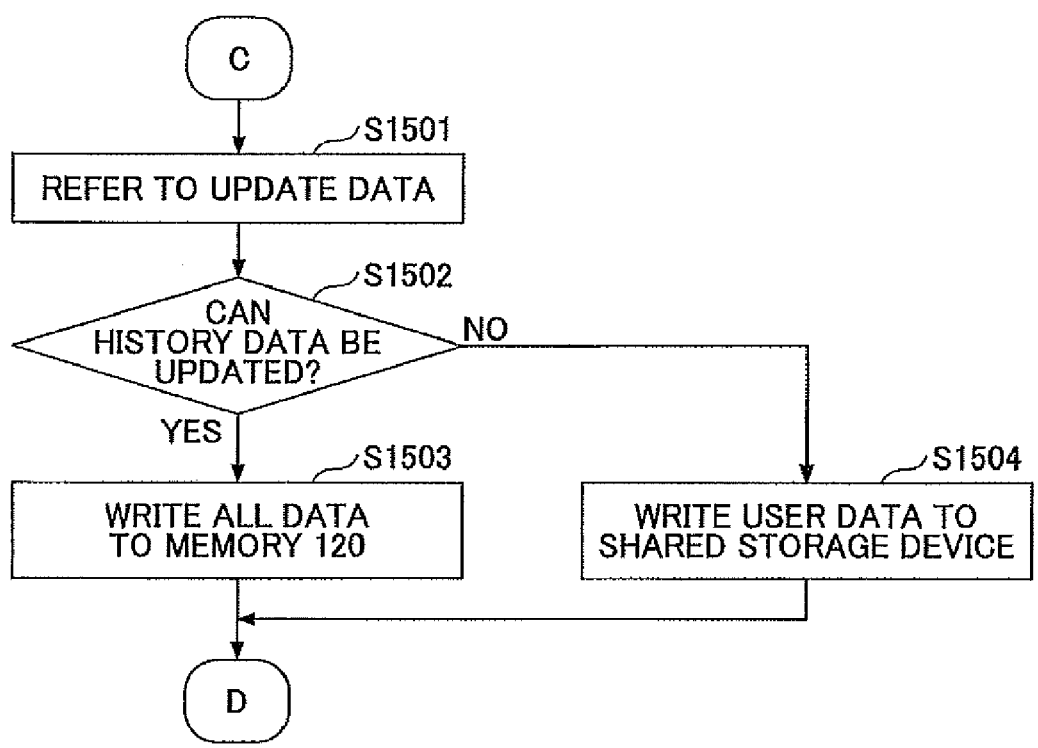
FIG. 15 is a flowchart for describing an operation C according to an embodiment of the present invention.

Next, an operation in Step S1212 is described with reference to FIGS. 12 and 15. When communication is started in Step S1206, the main control part 110A starts operation C (Step S1212). FIG. 15 illustrates a flowchart for describing the operation C.

When communication is started, the authenticating part 112A of the main control part 110A refers to update data stored in the memory 120 for detecting update history in the memory 120 (Step S1501). The update determining part 174 determines whether history data stored in the memory 120 can be updated based on the update data referred to in Step S1501 (Step S1502).

In a case where the update determining part 174 determines that history data can be updated (Yes in Step S1502), the write control part 172 of the memory control part 111A writes all the data read from the apparatus A including history data and user data to the memory 120 (Step S1503). In a case where the update determining part 174 determines that history data cannot be updated (No in Step S1502), the write control part 172 of the memory control part 111A writes, for example, the user data included in the data read from the apparatus A to the memory 120 (Step S1504).

After the writing of data in Steps S1503 or S1504 is completed, the operation of FIG. 15 proceeds to D which corresponds to Step S1213 of FIG. 12. The operation of S1213 is described below.

Accordingly, in the above-described embodiment of the present invention, since history data are written to the memory 120 only in the case where history data can be updated, inappropriate transfer of history data (e.g., charge data or counted data corresponding to the services provided by the image forming apparatus 100B) can be prevented.

After the operations A, B, C of FIGS. 13-15 included in Steps S1210, S1211, and S1212 of FIG. 12 are completed, the operation of FIG. 12 proceeds to the operation D (Step S1213).

Next, the operation D in Step S1213 of FIG. 12 is described. In operation D, a determination process is performed by the writing completion determining part 173 of the main control part 110A. The writing completion determining part 173 is for determining whether history data and/or user data are properly recorded in the memory 120 in operations A, B, and C. For example, the writing completion determining part 173 refers to the memory 120 and determines whether data corresponding to the results of the operations A, B and C are recorded in the memory 120. In a case where data corresponding to the results of the operations A, B and C are recorded in the memory 120, the writing completion determining part 173 determines that data are properly recorded in the memory 120 and determines that writing of data is completed.

After the process of operation D is completed, the main control part 110A displays the determination result of the writing completion determining part 173 in a display part (Step S1214). The display part may be, for example, the control panel 38.

With the above-described embodiment of the present invention, by determining the type of apparatus of the communication partner, by determining the existence of recording history, and determining whether history data can be updated in a case of transferring data, tampering with data (e.g., counted data or charging data) or erroneous transferring of data can be prevented.

In the above-described embodiment of the present invention, any one of or combinations of the operations A, B, and/or C may be performed. The operation or the combination of operations to be performed is preferred to be set beforehand to the image forming apparatus 100B.

The present invention is not limited to the specifically disclosed embodiments, and variations and modifications may be made without departing from the scope of the present invention.

The present application is based on Japanese Priority Application Nos. 2008-012014 and 2008-207395 filed on Jan. 22, 2008 and Aug. 11, 2008, respectively, the entire contents of which are hereby incorporated herein by reference.

What is claimed is:

1. A communication apparatus comprising:
a first communicating part that reads data stored in a storage device of an outside apparatus and writes data in the storage device of the outside apparatus;
a second communicating part that transmits and receives data with respect to the outside apparatus;
an operation controlling part that operates either the first communicating part or the second communicating part; and
a shared storage device that stores data related to the communication apparatus and is shared by the first and the second communicating parts;
wherein the operation controlling part is configured to operate the first communicating part when power is supplied to the communication apparatus and operate the second communicating part when power is not supplied to the communication apparatus;
wherein the shared storage device is configured to be connected to the first communicating part when power is supplied to the communication apparatus and connected to the second communicating part when power is not supplied to the communication apparatus;
wherein the operation controlling part includes a selecting part configured to select one of the first and the second communicating parts;
wherein the one of the first and the second communicating parts selected by the selecting part is configured to access the shared storage device;
the communication apparatus further comprising a shared antenna that is shared by the first and second communicating parts;
wherein the operation controlling part includes a correcting part configured to correct a resonance frequency of the shared antenna in correspondence with the one of the first and the second communicating parts selected by the selecting part;
the communication apparatus further comprising a data managing part that manages the data stored in the shared storage device, wherein the data stored in the shared storage device includes history data related to the history of usage of the communication apparatus and user data related to the user of the communication apparatus;
the communication apparatus further comprising a write control part that controls writing of data to the shared storage device; and a type determining part that determines the type of the outside apparatus;
wherein the data read from the storage device of the outside apparatus includes the history data and the user data;
wherein the write control part is configured to write the history data and the user data included in the data read from the storage device of the outside apparatus to the shared storage device when the type determining part determines that the outside apparatus is the same type as the communication apparatus;
wherein the write control part is configured to write the user data included in the data read from the storage device of the outside apparatus to the shared storage device when the type determining part determines that the outside apparatus is not the same type as the communication apparatus,
the communication apparatus further comprising an update determining part that determines whether the history data stored in the shared storage device can be updated;
wherein the data read from the storage device of the outside apparatus includes history data and user data;
wherein the write control part is configured to write all of the data read from the storage device of the outside apparatus to the shared storage device when the update determining part determines that the history data stored in the shared storage device can be updated;
wherein the write control part is configured to write the user data included in the data read from the storage device of the outside apparatus to the shared storage device when the update determining part determines that the history data stored in the shared storage device cannot be updated.

2. The communication apparatus as claimed in claim 1, wherein the selecting part is configured to select the first communicating part as the communicating part for accessing the shared storage device when power is supplied to the communication apparatus and select the second communicating part as the communicating part for accessing the shared storage device when no power is supplied to the communication apparatus.

3. The communication apparatus as claimed in claim 1, wherein the shared antenna includes an antenna coil and a resonance condenser that are connected in series, wherein the correcting part includes a condenser connected in parallel with the antenna coil.

4. The communication apparatus as claimed in claim 1, wherein the shared antenna includes an antenna coil, a resonance condenser, and a switching member that are connected in parallel, wherein the correcting part includes a condenser connected in series with the antenna coil.

5. The communication apparatus as claimed in claim 1, wherein the first communicating part includes an authenticating part that authenticates the outside apparatus.

6. The communication apparatus as claimed in claim 5, further comprising:
a display part;
wherein the first communicating part is configured to display a result of the authentication by the authenticating part.

7. The communication apparatus as claimed in claim 1, further comprising:
- a history determining part that determines an existence of any writing history in the shared storage device, the writing history indicating whether the data read from the storage device of the outside apparatus are written in the shared storage apparatus;
- wherein the data read from the storage device of the outside apparatus includes history data and user data;
- wherein the write control part is configured to write the user data included in the data read from the storage device of the outside apparatus to the shared storage device when the history determining part determines that writing history exists in the shared storage device;
- wherein the write control part is configured to write all of the data read from the storage device of the outside apparatus to the shared storage device when the history determining part determines that no writing history exists in the shared storage device.

8. The communication apparatus as claimed in claim 1, further comprising:
- a writing completion determining part that determines whether writing of data is completed by the write control part; and
- a display part that displays a result of the determination of the writing completion determining part.

9. A method of communicating by using a communication apparatus including first and second communicating parts and a shared storage device, comprising the steps of
- a) reading data stored in a storage device of an outside apparatus and writing data in the storage device of the outside apparatus with the first communicating part;
- b) transmitting and receiving data with respect to the outside apparatus with the second communicating part;
- c) sharing the shared storage device with the first and the second communicating parts;
- d) selecting one of the first and the second communicating parts; and
- e) accessing the shared storage device with the first communicating part and executing step a) when the first communicating part is selected in a case where power is supplied to the communication apparatus and accessing the shared storage device with the second communicating part and executing step b) when the second communicating part is selected in a case where power is not supplied to the communication apparatus;
- wherein the shared storage device is connected to the first communicating part when power is supplied to the communication apparatus and connected to the second communicating part when power is not supplied to the communication apparatus;

the method further comprising:
sharing a shared antenna by the first and second communicating parts;
correcting a resonance frequency of the shared antenna in correspondence with the one of the first and the second communicating parts;
managing the data stored in the shared storage device, wherein the data stored in the shared storage device includes history data related to the history of usage of the communication apparatus and user data related to the user of the communication apparatus;
controlling writing of data to the shared storage device;
determining the type of the outside apparatus;
wherein the data read from the storage device of the outside apparatus includes the history data and the user data;
writing the history data and the user data included in the data read from the storage device of the outside apparatus to the shared storage device when determining that the outside apparatus is the same type as the communication apparatus;
writing the user data included in the data read from the storage device of the outside apparatus to the shared storage device when determining that the outside apparatus is not the same type as the communication apparatus;
determining whether the history data stored in the shared storage device can be updated;
wherein the data read from the storage device of the outside apparatus includes history data and user data;
writing all of the data read from the storage device of the outside apparatus to the shared storage device when determining that the history data stored in the shared storage device can be updated; and
writing the user data included in the data read from the storage device of the outside apparatus to the shared storage device when determining that the history data stored in the shared storage device cannot be updated.

10. A non-transitory computer-readable recording medium on which a program is recorded for causing a computer to execute a communications method using a communication apparatus including first and second communicating parts and a shared storage device, the method comprising the steps of:
- a) reading data stored in a storage device of an outside apparatus and writing data in the storage device of the outside apparatus with the first communicating part;
- b) transmitting and receiving data with respect to the outside apparatus with the second communicating part;
- c) sharing the shared storage device with the first and the second communicating parts;
- d) selecting one of the first and the second comminicating parts; and
- e) accessing the shared storage device with the first communicating part and executing step a) when the first communicating part is selected in a case where power is supplied to the communication apparatus and accessing the shared storage device with the second communicating part and executing step b) when the second communicating part is selected in a case where power is not supplied to the communication apparatus;
- wherein the shared storage device is connected to the first communicating part when power is supplied to the communication apparatus and connected to the second communicating part when power is not supplied to the communication apparatus;

the method further comprising
sharing a shared antenna by the first and second communicating parts;
correcting a resonance frequency of the shared antenna in correspondence with the one of the first and the second communicating parts;
managing the data stored in the shared storage device, wherein the data stored in the shared storage device includes history data related to the history of usage of the communication apparatus and user data related to the user of the communication apparatus;
controlling writing of data to the shared storage device;
determining the type of the outside apparatus;
wherein the data read from the storage device of the outside apparatus includes the history data and the user data;
writing the history data and the user data included in the data read from the storage device of the outside apparatus to the shared storage device when determining that the outside apparatus is the same type as the communication apparatus;

writing the user data included in the data read from the storage device of the outside apparatus to the shared storage device when determining that the outside apparatus is not the same type as the communication apparatus;

determining whether the history data stored in the shared storage device can be updated;

wherein the data read from the storage device of the outside apparatus includes history data and user data;

writing all of the data read from the storage device of the outside apparatus to the shared storage device when determining that the history data stored in the shared storage device can be updated; and writing the user data included in the data read from the storage device of the outside apparatus to the shared storage device when determining that the history data stored in the shared storage device cannot be updated.

* * * * *